March 23, 1948.    H. M. LAING    2,438,174
FASTENER APPLYING TOOL
Filed Feb. 28, 1944
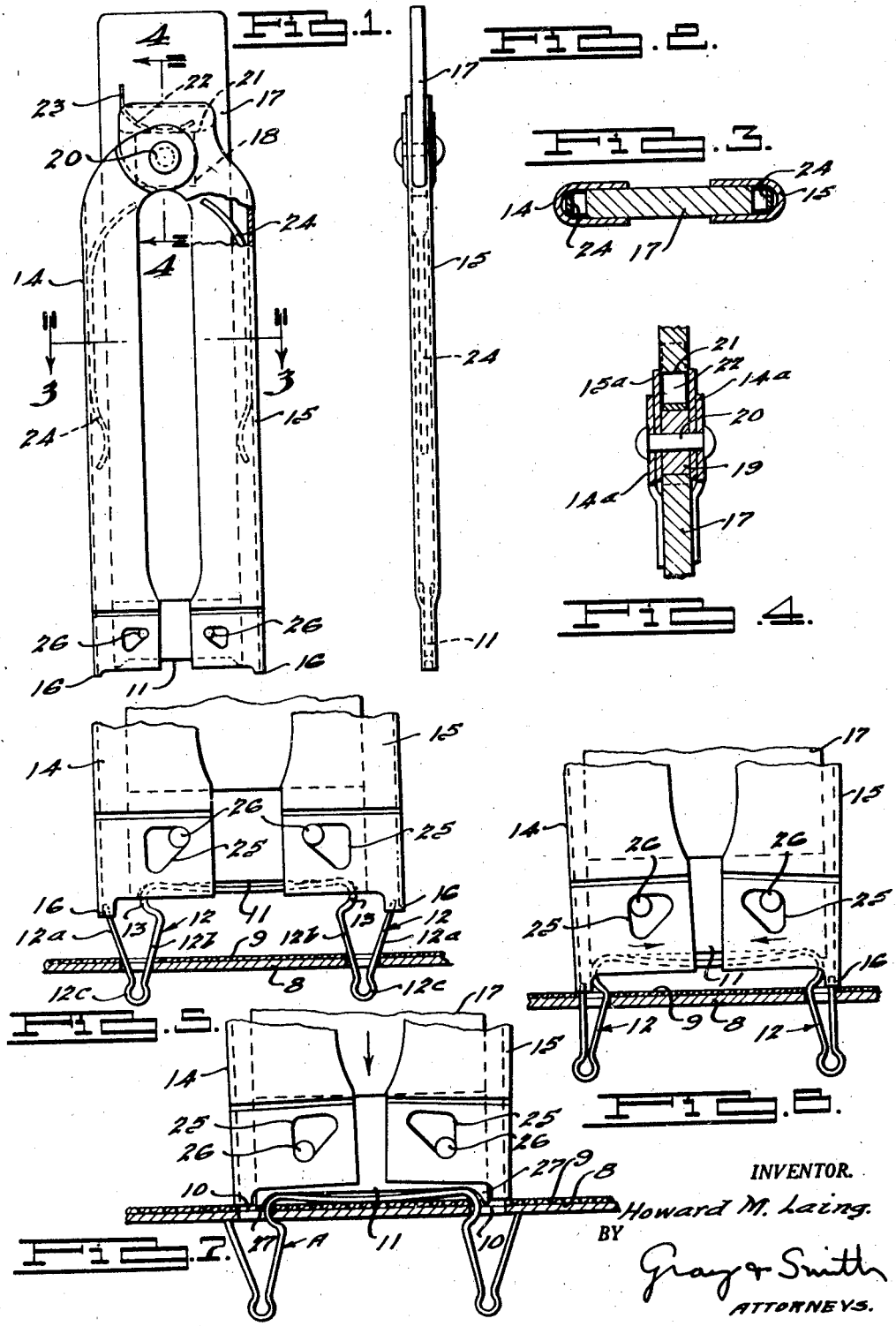
INVENTOR.
Howard M. Laing.
BY
Gray & Smith
ATTORNEYS.

Patented Mar. 23, 1948

2,438,174

UNITED STATES PATENT OFFICE 2,438,174

FASTENER APPLYING TOOL

Howard M. Laing, Detroit, Mich., assignor to Briggs Manufacturing Company, Detroit, Mich., a corporation of Michigan Application February 28, 1944, Serial No. 524,189

5 Claims. (Cl. 29—270)

This invention relates to tools for installing or assembling fastener devices and more particularly devices adapted for the purpose of attaching a plurality of parts together, such as the attachment of covering or fabric skin to the skeleton frame, rib members or other structural parts of an aircraft. Fastener devices, which are especially adapted to be installed by means of a tool constructed in accordance with the present invention, are of the kind having yieldable or resilient elements insertable through aligned holes in the fabric covering and frame member of an aircraft wing, aileron or the like and when thus installed are adapted to hold or clamp the fabric covering firmly in place.

An object of the present invention is to provide an improved tool useful for the above mentioned purposes which may be readily manipulated to hold the fastener device in position for installation and by which the device may be inserted through the registering holes in the materials and quickly forced into attaching position.

A further object of the invention is to provide an improved tool of relatively simple construction which may be easily manipulated to grip the fastener device and insert it through the materials to be attached together and in which means are incorporated in the tool to force the device into attaching position.

Other objects of this invention will appear in the following description and appended claims, reference being had to the accompanying drawings forming a part of this specification wherein like reference characters designate corresponding parts in the several views.

Fig. 1 is a front elevation, partly broken away, of a tool embodying the present invention.

Fig. 2 is a side elevation of the tool shown in Fig. 1.

Fig. 3 is a section taken substantially through lines 3—3 of Fig. 1 looking in the direction of the arrows.

Fig. 4 is a section taken substantially through lines 4—4 of Fig. 1 looking in the direction of the arrows.

Figs. 5, 6 and 7 are enlarged fragmentary views illustrating successive steps in the installation of a fastener device.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention applied to a tool for installing a resilient fastener device in a portion of an aircraft structure, such as an aileron or other airfoil, the particular fastener device illustrated in the drawings being constructed for the purpose of attaching the fabric skin or covering to the skeleton frame or rib element of the airfoil. There is shown at 8 a portion of a cap strip or other frame member of the airplane over which the fabric covering or skin 9 is to be stretched. The layers of material 8 and 9, to be attached together, are provided with pairs of aligned or registering apertures 10 through which the resilient portions of the fasteners are to be inserted.

The fastener device, generally indicated at A, is of compound construction embodying a top horizontal bar 11 adapted to engage the outer layer of material between the apertures 10. This bar terminates in depending yieldable fastener elements 12 insertable through the apertures 10. The fastener device A is formed from a single strip of spring steel and the spring bar 11 is downwardly bowed between its ends so as to provide, in effect, a resilient spring bow. At opposite ends of the bar 11 the metal of the strip is bent to provide curved return bends 13 terminating in the projecting fastener elements 12 which are generally V-shaped and reversely formed. Each element or member 12 comprises outer and inner upwardly diverging legs 12a and 12b connected together at the lower ends thereof by a spring bend or eye portion 12c. As a result of the foregoing construction it will be seen that the leg portions 12a and 12b of each member or element 12 may be yieldingly compressed together, and furthermore by virtue of the spring bends 13 the members 12 may be bodily moved toward each other to exert tension on the bowed spring bar 11.

The tool for installing the fastener device A comprises a pair of pivoted gripping jaws 14 and 15 formed of sheet metal and each being channel-shaped in construction as illustrated in Fig. 3. The jaws 14 and 15 terminate in channel-shaped projections 16 which form sockets for receiving the upper ends of the outer legs 12a of the fastener device. The present tool also comprises an ejector slide bar 17 which is of such thickness as to fit between the sides of the channel-shaped jaws 14 and 15, as shown in Fig. 3. By this construction the slide bar 17 is guided by and held in place between the parallel side flanges of the jaws. Near its upper end the bar 17 is formed with a square aperture 18 within which is received a correspondingly shaped spacer block 19. The jaws 14 and 15 at their upper ends are formed with inwardly extending overlapping portions 14a and 15a, respectively, the portion 14a of the jaw 14 being widened, as shown in Fig. 4, to embrace the projecting portion 15a of the jaw 15. These overlapping portions of the jaws are pivoted together by means of a rivet 20 which extends therethrough and also through the spacer block 19. By this construction the jaws 14 and 15 are pivotally connected together so as to permit them to be swung toward and away from each other.

The aperture 18 in the slide bar 17 extends a suitable distance above the spacer block 19 and is widened, as shown at 21, so as to receive a leaf spring 22. This spring has a bowed portion engaging the upper edge of the spacer block 19 and has one end anchored in a slit 23 in the bar 17. By virtue of this construction it will be seen that the bar 17 may be shifted vertically relatively to the jaws 14 and 15 due to the fact that the spacer block 19 will slide within the square aperture 18 and the aperture 21. Downward movement of the slide bar 17 relative to the jaws is resisted by the spring 22 which acts to return the bar to its normal position shown in Fig. 1.

Interposed between the jaws 14 and 15 and the side edges of the slide bar 17 are leaf springs 24 which, as shown in Fig. 3, are housed within the channel-shaped jaws and thus act to yieldingly resist inward movement of the jaws relative to each other.

The lower ends of the jaws 14 and 15, at the front sides thereof, are formed with generally triangular shaped apertures 25 into which extend stop pins 26 secured to the slide bar 14. The pins 26 cooperate with the edges of the apertures 25 to limit the inward movement of the jaws when pressed together and also the vertical movement of the slide bar 17 when shifted downwardly with respect to the jaws. The bar 17 at its lower end is formed with projecting tips 27 forming a socket for receiving the spring bar 11 of the fastener with the projecting tips 27 extending around and embracing the curved ends 13 of the spring bar.

In the use of the present tool for the purpose of installing a fastener device A, the bar portion 11 of the device is placed in the socket at the lower edge of the slide member 17 and the tips of the legs 12a are inserted into the socket portions 16 at the lower ends of the jaws in the manner shown in Fig. 5. The jaws 14 and 15 are grasped in the hand and squeezed together, thereby contracting or forcing together the legs of the projecting fastener members 12. The position of the parts, when the jaws are compressed, is shown in Fig. 6 and it will be seen that the legs of the fastener are not only contracted and thereby placed under tension but also the spring bow 11 is put in compression between the projections 27 of the slide bar, thereby increasing the bowed shape of the spring bar 11. With the fastener device thus gripped by the jaws 14 and 15 against the lower edge of the slide bar 17 the ends 12c of the fastener are inserted through the holes or apertures 10 to substantially the position shown in Fig. 6 where the projecting ends 16 of the jaws engage the top layer of material 9. At this point when the downward progress of the jaws is arrested by their engagement with the material, the upper end of the slide bar 17 is struck a sharp blow with the hand, thereby forcing the slide bar downwardly which in turn forces the legs 12a and 12b of the fastener completely through the apertures 10. When the ends of the legs of the fastener clear the apertures 10, they will spring into the gripping position shown in Fig. 7 at the underside of the sheet 8. The spring 22 will return the slide bar from the position shown in Fig. 7 to its normal position illustrated in Fig. 1, and upon release of the pressure on the jaws 14 and 15 they will return to their normal positions by the springs 24 as shown in Figs. 1 and 5.

I claim:

1. A tool for installing a fastener in materials to be attached together, comprising a pair of gripping members having lower ends adapted to engage the fastener and grip the same therebetween, a slide member interposed between said gripping members, the adjacent edges of said slide member and said gripping members having cooperating guide portions for guiding the slide by said gripping members for sliding movement relative thereto, and a pivotal connection between the upper end of said gripping members extending through the upper end of said slide member, said slide member having means engageable with the fastener intermediate the gripping members and cooperating with the latter to grip the fastener and also slidable relatively thereto for forcing the fastener out of gripped position therebetween.

2. A tool for installing a fastener in materials to be attached together, comprising a pair of gripping members having lower ends adapted to engage the fastener and grip the same therebetween, a slide member interposed between said gripping members, the adjacent edges of said slide member and said gripping members having cooperating guide portions for guiding the slide by said gripping members for sliding movement relative thereto, a pivotal connection between the upper ends of said gripping members extending through the upper end of said slide member, said slide member having its lower end engageable with the fastener intermediate the gripping members and cooperable with the latter to grip the fastener and also slidable relatively thereto for forcing the fastener out of gripped position therebetween, spring means resisting relative movement of the gripping members into position to grip the fastener, and spring means resisting movement of said slide member in said direction.

3. A tool for installing a fastener in materials to be attached together, comprising an ejector slide, a pair of channel shaped jaw members each receiving opposite sides of said slide for guiding the same during sliding movement of the slide relative to the jaw members, a pivot connecting adjacent upper ends of the jaws together and extending through the upper end of the slide, spring means resisting relative movement of the lower ends of the jaws into position to grip the fastener therebetween, said slide being shiftable into position to eject the fastener from the jaws by engagement with the fastener intermediate said jaws.

4. A tool for installing a fastener in materials to be attached together, comprising an ejector slide, a pair of channel shaped jaw members receiving opposite sides of said slide for guiding the same during sliding movement of the slide relative to the jaw members, a pivot connecting adjacent upper ends of the jaws together and extending through the upper end of the slide, said slide being shiftable relative to said jaws and pivot into position to eject the fastener from the jaws by engagement with the fastener intermediate said jaws.

5. A tool for installing a fastener in materials to be attached together, comprising an ejector slide, a pair of channel shaped jaw members receiving opposite sides of said slide for guiding the same during sliding movement of the slide relative to the jaw members, a pivot connecting adjacent upper ends of the jaws together and extending through the upper end of the slide, spring means interposed between the jaw members and ejector slide and housed within the channels of the jaw members for resisting relative movement of the lower ends of the jaws into position to grip the fastener therebetween, said slide being shiftable into position to eject the fastener from the jaws by engagement with the fastener intermediate said jaws.

HOWARD M. LAING.

REFERENCES CITED

The following references are of record in the file of this patent:

UNITED STATES PATENTS

| Number | Name | Date |
| --- | --- | --- |
| 218,143 | Shellenberger | Aug. 5, 1879 |
| 1,256,553 | Grings | Feb. 19, 1918 |
| 1,271,330 | Lewis | July 2, 1918 |
| 1,305,132 | Lewis | May 27, 1919 |
| 1,351,429 | Lewis | Aug. 31, 1920 |
| 1,357,173 | Lewis | Oct. 26, 1920 |
| 1,357,176 | Lewis | Oct. 26, 1920 |
| 1,400,843 | Wilbur | Dec. 20, 1921 |
| 2,071,648 | Moeller | Feb. 23, 1937 |
| 2,080,634 | Scharfroth | May 18, 1937 |
| 2,182,594 | Matveyeff | Dec. 5, 1939 |
| 2,218,934 | Germain | Oct. 22, 1940 |